United States Patent

[11] 3,631,592

[72] Inventor George D. Wilson
Torrence, Calif.

[21] Appl. No. 40,035
[22] Filed May 25, 1970
[45] Patented Jan. 4, 1972

[73] Assignee Sperry Rand Corporation
New York, N.Y.

[54] METHOD OF FORMING A TUNNEL STRUCTURE FOR A MAGNETIC PLATED WIRE MEMORY ARRAY
2 Claims, 3 Drawing Figs.

[52] U.S. Cl. .................................................. 29/604, 340/174 PW, 340/174 VA
[51] Int. Cl. .................................................. H01f 7/06
[50] Field of Search .......................................... 29/604; 264/272; 156/292; 340/174 PW, 174 VA, 174 MA

[56] References Cited
UNITED STATES PATENTS

| | | | |
|---|---|---|---|
| 3,465,432 | 9/1969 | Crimmins et al. | 29/604 |
| 3,448,514 | 6/1969 | Reid et al. | 29/604 |
| 3,460,114 | 8/1969 | Chow | 340/174 PW |
| 3,513,538 | 5/1970 | Bryzinski | 29/604 |

*Primary Examiner*—John F. Campbell
*Assistant Examiner*—Carl E. Hall
*Attorneys*—Kenneth T. Grace, Thomas J. Nikolai and John P. Dority

ABSTRACT: A method of forming the insulative base supported copper word lines and/or ground plane about parallelly aligned spaced-apart forming wires with the interstitial portions therebetween forming the tunnel structure. The copper word lines and the adhesively coated opposing faces of their plastic bases are bonded to the touching surfaces of the forming wires with the interstitial portions, the portions between the spaced-apart forming wires, forming the tunnels into which the respectively associated plated wire memory elements are inserted.

INVENTOR
GEORGE D. WILSON
BY Kenneth S. Grace
ATTORNEY

METHOD OF FORMING A TUNNEL STRUCTURE FOR A MAGNETIC PLATED WIRE MEMORY ARRAY

BACKGROUND OF THE INVENTION

The invention herein described was made in the course of or under a contract or subcontract thereunder, with the Department of the Air Force.

The present invention relates in general to magnetic memory arrays for data processing equipment and in particular to tunnel structures for plated wire memory arrays. Such plated wire memory arrays generally include a plurality of parallelly aligned plated wires, each of a beryllium-copper base of 0.0050-inch diameter with a 10,000 A (Angstrom) coating of 81% Ni–19% Ne, that are inductively coupled to a plurality of parallelly aligned copper word lines, each of 0.0014 inch thick and 0.050-inch width copper sheet, that are orthogonally oriented with respect to the sandwiched plated wire bit lines. A coincident coupling of the desired drive current amplitude of a first or of a second and opposite polarity to the selected plated wire bit lines and of the desired drive current amplitude of a first polarity to the selected word line sets the magnetization of the selected plated wire bit lines in a first or a second and opposite circumferential direction representative of the storing of a binary 1 or 0 at the plated wire bit line, word line, intersection-forming memory elements. Coupling of the desired drive current amplitude of a first polarity to the one selected word line induces in the associated plated wire bit lines signals indicative of the information content of the respectively associated memory elements.

Packaging of the plated wire memory array generally consists of a base material having a plurality of parallelly arranged holes or tunnels therethrough in which are passed the plated wire bit lines which, in turn, are enveloped by the plurality of parallelly arranged word lines which are orthogonally oriented with respect to the bit lines. The bit lines are loosely constrained by the tunnels, thus imposing no stress inducing magnetic effects upon the plated wire bit line, while achieving the desired bit line, word line, orientation. Some typical plated wire tunnel structures are exemplified by the Sasaki et al. U.S. Pat. No. 3,465,308 and Maeda U.S. Pat. No. 3,460,113.

SUMMARY OF THE INVENTION

The present invention is directed toward a method of forming insulative base supported copper word lines and/or ground planes about parallelly aligned spaced-apart forming wires with the interstitial portions therebetween forming the tunnel structure. The method broadly consists of: sandwiching a plurality of parallelly aligned spaced-apart coplanar forming wires between two word line supporting insulative bases that have their opposing surfaces treated with a suitable adhesive; bringing the forming wires and the adhesively treated surfaces of the two insulative bases into contact; curing the adhesive so as to cause the forming wires and the two insulative bases to form an integral structure; trimming the tunnel structure to size; and inserting the plated wires bit lines in the interstitial tunnels between the forming wires.

DESCRIPTION OF THE PREFERRED EMBODIMENT

Figure 1:
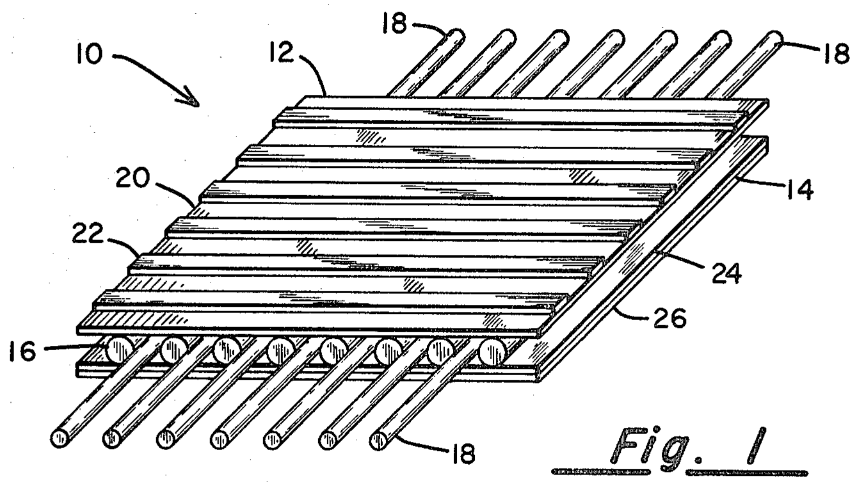
FIG. 1 is a trimetric view of a preferred embodiment of a plated wire memory array fabricated in accordance with the present invention.

With particular reference to FIG. 1, there is presented a trimetric view of a preferred embodiment of a plated wire memory array incorporating the tunnel structure fabricated by the present invention. Array 10 is comprised of an integral tunnel structure formed by printed circuit members 12, 14, adhesively sandwiching a plurality of parallelly arranged spaced-apart forming wires 16 therebetween. A plurality of plated wire bit lines 18 are loosely constrained within the interstitial, between adjacent forming wire 16, tunnels. Printed circuit member 12 is preferably comprised of a polyimide film such as a Kapton H-film base 20 having a plurality of copper conductors 22 formed thereon by well known methods, while printed circuit member 14 is preferably comprised of a Kapton base 24 having a copper ground plane affixed thereto. The Kapton bases 20, 24 are preferably 0.00025 inch thick but may be of any suitable insulative material or thickness while the conductive layers thereon are preferably of 1-ounce copper (0.0014 thick) sheet affixed thereto. The so-formed tunnel structure maintains the desired inductive relationship between the plated wire bit lines 18 and the enveloping conducting word lines 22 and ground plane 26.

Figure 2:
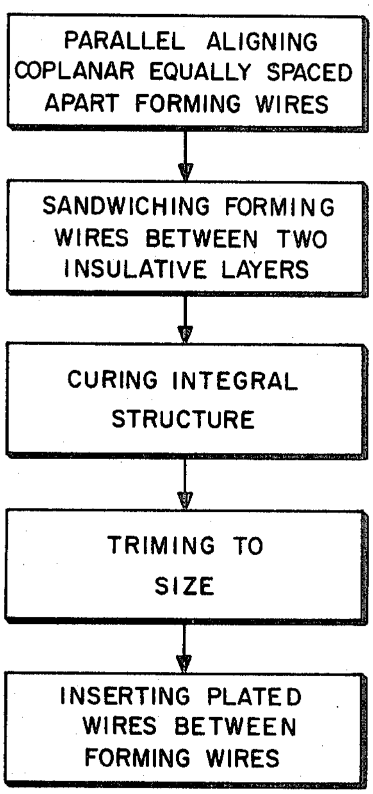
FIG. 2 is a flow diagram illustrating a typical series of steps that may be followed in preparing a plated wire memory array in accordance with the preferred technique of the present invention.
Figure 3:
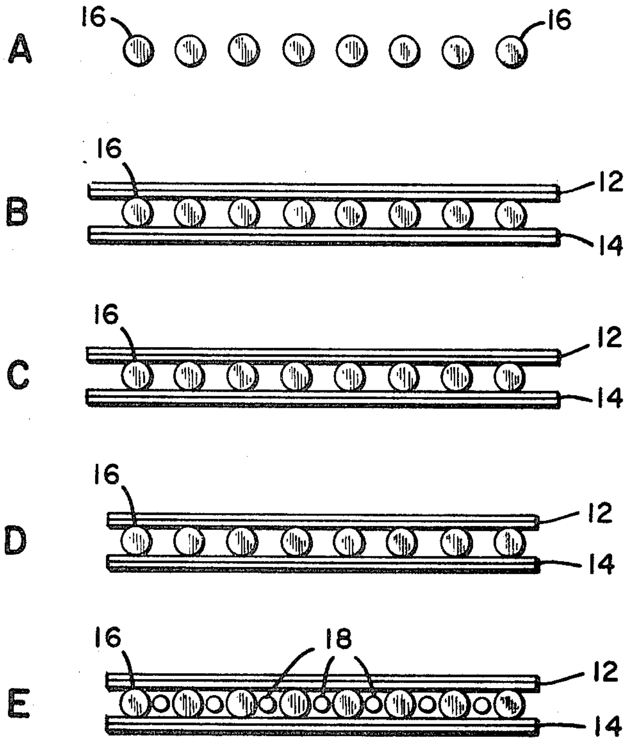
FIG. 3 is a series of views illustrating a typical production plated wire memory array which is under preparation in accordance with the techniques of FIG. 2, the various figures illustrating the apparatus progressively in various stages of its production and corresponding to the steps which are indicated adjacently in the flow diagram of FIG. 2.

Discussion of an exemplary method of fabrication of the plated wire memory array 10 of FIG. 1 proposed by the present invention shall proceed with reference to FIGS. 2 and 3. FIG. 2 illustrates a flow diagram of a series of steps which may be followed in preparing the tunnel structure in accordance with a preferred technique of the present invention. FIG. 3 illustrates progressively the appearance of the product of the present invention during various stages of its fabrication. Each of the illustrations of FIG. 3 are located adjacent the step during which it is formed, as seen in the flow chart in FIG. 2.

As indicated by the flow chart of FIG. 2, a preferred method of practicing the illustrated embodiment of the present invention commences with parallelly aligning a plurality of spaced-apart planar forming wires 16 as noted in step A. Such forming wires 16 are preferably strung forth and back across a suitable mandrel or jig having two parallels coplanar cross members with grooves or pins therein for establishing the desired spacing between the forming wires 16, and, accordingly, the interstitial spaces between adjacent forming wires 16. Forming wires 16 are preferably conductive wires such as beryllium-copper wires of 0.0070-inch diameter.

After aligning the plurality of forming wires 16 in step A, step B of the present embodiment is initiated. Step B involves sandwiching the plurality of forming wires 16 between two printed circuit members 12, 14 having the desired conductive layers on their outside surfaces and an insulating base member, the opposing faces of which have a suitable adhesive affixed thereto. Using the Kapton insulative bases 20, 24 of printed circuit members 12, 14, a suitable adhesive utilized by the inventor is perfluoro-ethylene-propylene Teflon or Hysol Adhesive AS7–2094 manufactured by Hysol Corp., Olean, N. Y. Such adhesive should be evenly distributed over opposing surfaces of printed circuit members 12, 14 being careful that the depth thereof be held to a minimum so as not to restrict the opening of the to-be-formed interstitial tunnels between adjacent forming wires 16. The bringing together of printed circuit members 12, 14 and forming wires 16 is preferably accomplished with a tooling jig, fixture or press having accurately aligned and spaced-apart opposing parallel faces for establishing a predetermined spacing therebetween.

This predetermined spacing will ensure that the insulative bases 20, 24 of printed circuit members 12, 14 will not be depressed about forming wires 16, that the adhesive will not be forced into the to-be-formed interstitial tunnels between adjacent forming wires 16 and that such interstitial tunnels will be of a sufficient opening to permit the easy passage therethrough of the plated wire bit lines 18.

The next step, step C, of the present invention involves curing the adhesive material applied to the opposing faces of the printed circuit members 12, 14 whereby the printed circuit members 12, 14 and the sandwiched forming wires 16 are formed into an integral structure. This curing step may involve heating the opposing planar faces of the tooling jig of step C above; however, the application of heat thereto, is not to be considered as a limitation to the present invention as many alternative suitable adhesives, not requiring the application of heat thereto, may be utilized.

The next step, step D, of the present invention involves trimming the integral structure formed in step C above to the desired size, or outside dimension. Such trimming may be accomplished by any of many methods such as cutting, shearing, or punching.

The next step, step E, of the present invention involves inserting the plurality of plated wire bit lines 18 in the interstitial tunnels formed between adjacent forming wires 16. This step may involve the hand insertion of the plated wire bit lines 18 in the interstitial tunnels between adjacent forming wires 16 or it may involve a core stringing machine such as that of the Fielder U.S. Pat. No. 3,331,126.

What is claimed is:

1. A method of forming a tunnel structure for a magnetic plated wire array, comprising:
  providing a plurality of parallelly aligned coplanar spaced-apart conductive forming wires;
  applying two insulative lamina to said plurality of wires such that said plurality is sandwiched between said lamina;
  compressing said two insulative lamina towards one another upon said forming wires to form an integral structure;
  bonding the elements of the so-formed integral structure together; and
  inserting said plated wires in the interstitial tunnels formed between the forming wires of the integral structure.

2. A method of forming a tunnel structure for a magnetic plated wire array, comprising:
  parallelly aligning a plurality of coplanar conductive forming wires;
  applying two insulative lamina to said plurality of wires such that said plurality is sandwiched between said lamina, said two lamina having their opposing surfaces treated with a curable adhesive;
  compressing said two insulative lamina towards one another upon said forming wires to form an integral structure;
  curing said adhesive to bond the elements of the so-formed integral structure;
  trimming the integral structure to size; and
  inserting said plated wires in the interstitial tunnels formed between the forming wires of the integral structure.

* * * * *